United States Patent

[11] 3,608,546

| [72] | Inventor | Jeffrey N. Shinn<br>Scotia, N.Y. |
|---|---|---|
| [21] | Appl. No. | 4,706 |
| [22] | Filed | Jan. 21, 1970 |
| [45] | Patented | Sept. 28, 1971 |
| [73] | Assignee | General Electric Company |

[54] FLUIDIC SPIROMETER
19 Claims, 4 Drawing Figs.

[52] U.S. Cl. .................................................. 128/2.08,
73/194
[51] Int. Cl. .................................................. A61b 5/08
[50] Field of Search ........................................... 128/2.08,
2.07; 73/194, 206, 205, 505; 137/81.5

[56] References Cited
UNITED STATES PATENTS

| 820,259 | 5/1906 | Renvoize ..................... | 128/2.08 |
|---|---|---|---|
| 2,669,874 | 2/1954 | Ziegler ......................... | 73/206 |
| 3,081,766 | 3/1963 | Dubsky et al. ................ | 128/2.08 |
| 3,343,413 | 9/1967 | South et al. ................... | 73/194 |
| 3,411,354 | 11/1968 | Josephson .................... | 73/194 X |
| 3,442,124 | 5/1969 | Warren et al. ................ | 73/194 |

FOREIGN PATENTS 74,108    1/1918    Austria ........................    128/2.08

OTHER REFERENCES

Amer. Journ. of Medical Electronics, 1963, July–Sept. pp. 207–211, (copy in Gr. 335, 128/2.08)

*Primary Examiner*—Richard A. Gaudet
*Assistant Examiner*—Kyle L. Howell
*Attorneys*—David M. Schiller, Arthur E. Fournier, Jr., Frank L. Neuhauser, Oscar B. Waddell and Joseph B. Forman ABSTRACT: An expendable mouthpiece transducer, fluidic circuitry for preventing the breathed air from contaminating the nonexpendable portion of the spirometer, a fluidic integrator, timer and a three-gage readout form the basic elements of an improved spirometer. The transducer generates a pneumatic pressure signal proportional to airflow rate breathed therethrough and the integrator integrates the flow rate to obtain the volume of air breathed through the transducer over a period of time. The three gages are controlled by the timer for operation to determine the total volume breathed for 1 second, 3 seconds, and a total lung volume for 10 seconds. A fluidic preamplifier is connected between the transducer and integrator, and an additional fluidic amplifier provides a sufficient pressure output to actuate the timer.

Inventor:
Jeffrey N. Shinn,
by Louis A. Moncha

Inventor:
Jeffrey N. Shinn,
by Louis A. Moncha

FLUIDIC SPIROMETER invention relates to a fluidic spirometer having an expendable mouthpiece transducer which generates a pressure signal proportional to airflow rate, and in particular, to a compact spirometer which utilizes fluidic circuitry having no moving mechanical parts for determining the volume of air breathed.

The spirometer described herein is an improved version of the basic spirometer described in a concurrently filed patent application Ser. No. 4,481, inventors Salvator Bottone, Jr. and Frank S. Ralbovsky and assigned to the assignee of the present invention.

Spirometer instruments are used in the medical field for the measurement of a patient's lung and breathing capacity and are especially useful for emphysema patients. Conventional spirometers employ pistons, bags, complex linkages and other electrical and moving parts devices for measuring the volume of air breathed by the patient. Due to the use of such mechanical devices in conventional spirometers, the size of such instrument is generally quite large and very inconvenient for portable use. Also, the pneumatic-to-electrical transducers utilized in conventional spirometers are delicate, expensive units which are often subject to malfunction.

Therefore, one of the principal objects of my invention is to provide an improved fluidic spirometer of compact structure and having an expendable mouthpiece transducer which generates a pressure signal proportional to airflow rate breathed therethrough.

Another object of my invention is to provide my spirometer with a fluidic integrator having no moving mechanical parts for integrating the flow rate to determine the volume of air breathed by the patient using the spirometer.

Briefly stated, my invention is an improved fluidic spirometer which includes an expendable mouthpiece transducer for generating a fluid pressure signal proportional to the air flow rate breathed therethrough. The flow rate signal is amplified in a fluidic preamplifier having no moving mechanical parts and is thence integrated in a fluidic integrator having no moving mechanical parts to provide a pressure signal proportional to the volume of air breathed over a period of time. The output of the integrator is connected to three pressure gage readout devices, each gage having its measurement time controlled by valves which open at predetermined times in response to the operation of a timing mechanism. The timer controls the valve to obtain 1 second, 3 seconds and 10 seconds volume measurements. The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein like parts in each of the several figures are identified by the same reference character, and wherein:

Figure 1:
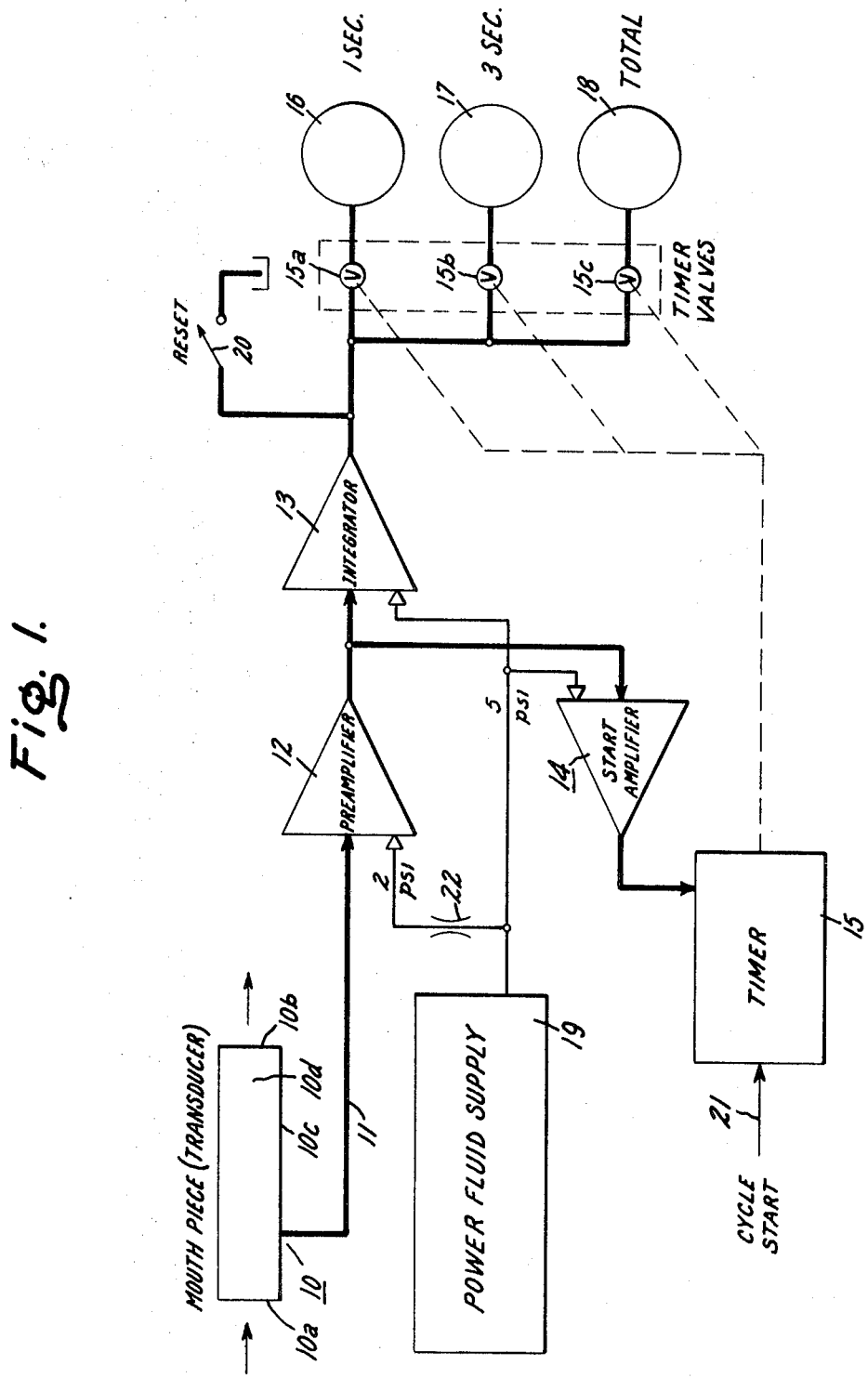
FIG. 1 is a one-line general schematic diagram of my fluidic spirometer system.
Figure 3:
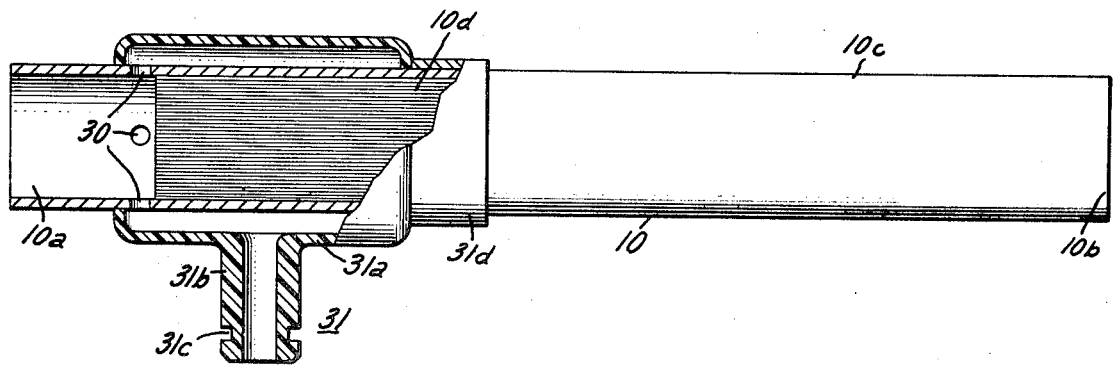
Figure 4:
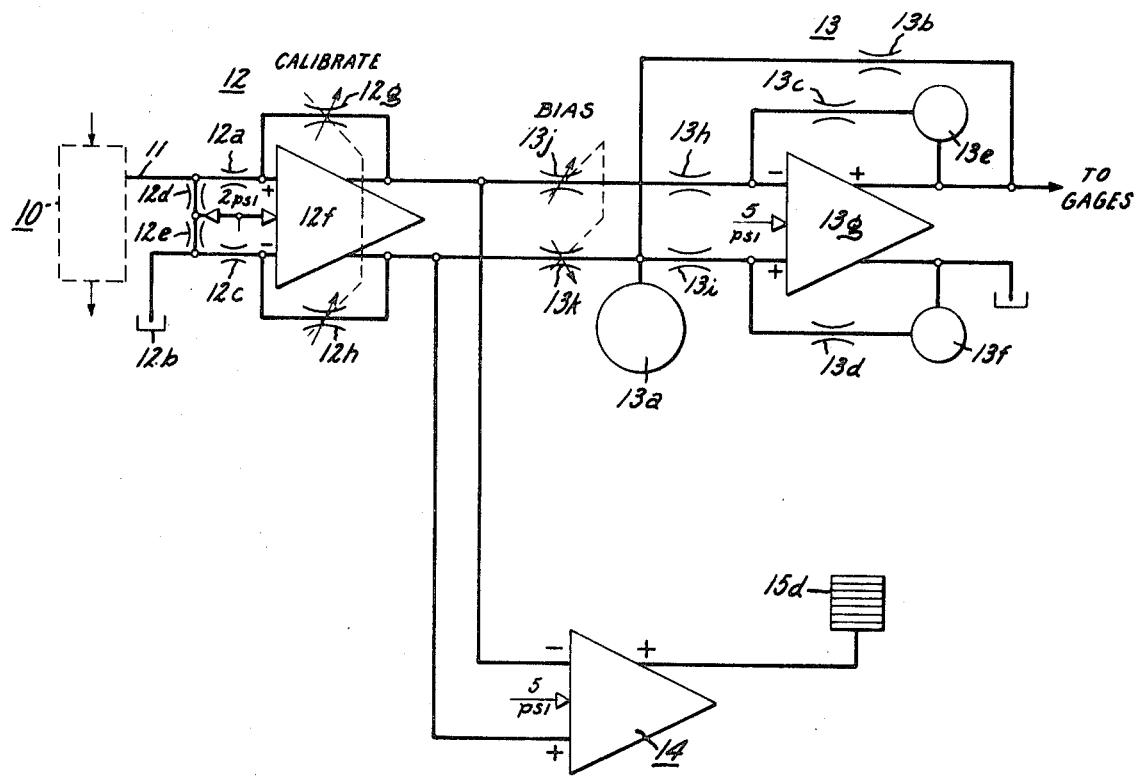

FIG. 3 is a view, partly in section, of the mouthpiece transducer portion of my spirometer; and FIG. 4 is a detailed schematic diagram of the fluidic circuitry portion of my spirometer. Referring now in particular to FIG. 1 there is shown a generalized schematic diagram of my entire fluidic instrument in one-line form. A more specific schematic diagram of the fluidic circuitry portion of the spirometer is illustrated in FIG. 4 which also indicates the actual dual (push-pull) inputs and outputs of the various fluidic circuit elements. The input element of my spirometer is a mouthpiece transducer 10 through which the patient exhales to the atmosphere as rapidly and completely as possible in order for the instrument to integrate the forced expiratory flow and thereby determine the patient's lung volume measurement. Mouthpiece 10 is a tubular member having a first end 10a for breathing therethrough and a second end 10b open to the atmosphere. As shown in FIG. 3, the tubular member comprises an outer tube 10c and a plurality of small diameter tubes 10d disposed in parallel relationship within tube 10c. The inner tubes 10d are of sufficient plurality to completely fill the interior of outer tube 10c and are of sufficient length to obtain a laminar flow of the air breathed therethrough. Small diameter tubes 10d are each of equal length and slightly shorter than outer tube 10c, and the first ends of tubes 10d are in close proximity to end 10b of the outer tube. As clearly indicated in FIG. 3, at least one aperture 30 is formed through outer tube 10c in the region removed from the plurality of small diameter tubes but closely adjacent thereto. In the specific embodiment illustrated in FIG. 3, four equally spaced apertures 30 are formed through tube 10c along a line defined by the intersection of tube 10c and a plane normal to the longitudinal axis of the tube.

A suitable manifold body 31 encloses and frictionally holds outer tube 10c in substantially airtight relationship along a portion of the length thereof which includes apertures 30. Manifold 31 is comprised of generally cylindrical member 31a having the ends thereof bent inward and adapted to provide a substantially airtight joint with the outer surface of outer tube 10c. Manifold 31 also includes a tubular passage member 31b extending radially outward from approximately the midpoint of the cylindrical member 31a. Tubular passage member 31b is provided with a quick-disconnect means such as a peripheral groove 31c for connection with a flexible tubing (not shown). Manifold 31 may also include a second cylindrical member 31d connected to the end of member 31a and which functions as a guide member for the insertion of tube 10c through the cylindrical member 31a of the manifold.

A variable pneumatic pressure signal is developed at the input end of the small diameter tubes 10d in the region of apertures 30 as a result of a patient exhaling into end 10a of mouthpiece transducer 10. The pressure of such signal varies linearly with the airflow rate through mouthpiece 10 due to the laminar flow conditions in tubes 10d. The pneumatic pressure signal is transmitted to member 31b of the manifold through apertures 30 and member 31a, and thence to a flexible tubing (not shown) connected at 31c for transmission to the fluidic circuitry to be hereinafter described. The flexible tubing 11 (shown in FIGS. 1, 2 and 4) has a first end terminating in a suitable quick-disconnect coupling for attachment with the annular groove 31c of the manifold. The primary function of the fluidic circuitry is to time integrate the flow rate pressure signal generated in the mouthpiece transducer 10 to thereby obtain a volume pressure signal which is indicative of the volume of air breathed through the mouthpiece over a particular interval of time. A secondary purpose of the fluidic circuitry is to actuate a timing mechanism which controls the opening of three valves connected in the output circuit of the integrator to obtain readout of three separate air breath volumes measured over three different periods of time.

The second end of flexible tubing 11 (see FIGS. 1 and 4) is connected to a control fluid input of a fluidic preamplifier 12. Preamplifier 12 may comprise one or more stages of serially connected proportional-type fluid amplifiers of conventional design to provide a sufficient pressure gain to drive a fluidic integrator 13 and a second fluid amplifier circuit 14 which initiates operation of a timer 15, this second amplifier circuit 14 being designated as the "start" amplifier. Fluidic circuits 12, 13 and 14 are each of the no moving mechanical parts type and circuits 13, 14 each also comprise one or more stages of serially connected proportional-type fluid amplifiers of conventional design to obtain high gain. Start amplifier 14 provides a sufficient pressure gain to actuate a small bellows 15d in one mechanical embodiment of timer 15 to thereby release a timing mechanism for controlling the different opening times of the valves 15a, 15b, 15c connected at the output of integrator 13.

Referring to the detailed schematic diagram of the fluidic circuitry in FIG. 4, preamplifier 12 includes an input circuit for developing a sufficient pressure in tubing 11 to prevent the air exhaled by the patient in breathing through transducer mouthpiece 10 from entering and possibly contaminating tubing 11 and fluidic circuit 12. Thus, the positive polarity (+) control input of the first stage amplifier is connected through input flow restrictor 12a to the second (output) end of flexible tubing 11, the negative polarity control input is connected to a vent 12b through restrictor 12c, and a series divider network consisting of restrictors 12d and 12e is connected from the tubing 11—restrictor 12a juncture to the vent 12b—restrictor 12c juncture. The power fluid supplied to the one or more stages of amplifiers 12f is also supplied to the restrictors 12d–12 juncture. The pressure of this fluid supplied to the restrictors 12d–12e juncture is sufficiently high, and the fluid resistance values of restrictors 12d and 12 e are chosen such that the constant pressure developed therefrom at the tubing 11– restrictor 12a juncture exceeds the maximum signal pressure developed at the input end of tubing 11 by the patient exhaling through mouthpiece 10. Restrictors 12a, 12c are of equal resistance value, and restrictors 12d, 12e are of equal resistance values.

Preamplifier 12 also includes dual (push-pull) negative feedback networks around amplifiers 12f connected from the two outputs (fluid receivers) of the last stage amplifier to the two control inputs of the first stage amplifier. The feedback networks include equal resistance value variable restrictors 12g, 12h connected for ganged operation in the same direction of varying resistance. It can be appreciated to those skilled in the feedback control systems art that the gain of preamplifier 12 approximates the ratio of the resistance values of feedback restrictor 12g to that of input restrictor 12a for the relatively high forward gain of the one or more stages of serially connected amplifiers 12f. Thus, ganged restrictors 12g, 12h are employed as a CALIBRATE adjustment in my spirometer for calibrating the readout means at the output of integrator 13 to obtain full scale reading (for a 7-liter input in one embodiment) by varying the preamplifier (and therefore the system) gain.

Preamplifier 12 in one embodiment includes two stages and has a closed loop pressure gain of 20 which results in the avoidance of a high-gain delicate integrator 13 design. Integrator 13 may thus be a conventional type such as illustrated in FIG. 4, including dual negative feedback networks and only a single positive feedback network due to the single output connected to the readout means pressure gages 16, 17, 18. The feedback networks are connected, as in the case of the preamplifier, from the outputs of the last stage amplifier to the control inputs of the first stage amplifier. The integrating fluid capacitor 13a in the positive feedback network is a large fixed volume, approximately 30 cubic inches, for providing a long R-C time constant (where R is restrictor 13b) and hence more ideal integration. The dual negative feedback networks include equal resistance value restrictors 13c and 13d and equal capacitance volumes 13e and 13f for converting the high gain forward network of serially connected amplifiers 13g to an operational amplifier which provides, among other features, constant gain independent of variation in power fluid supply pressure. Capacitors 13e, 13f in the negative feedback networks are small fixed volumes for providing stabilization of the closed loop integrator circuit. Again, the gain of the integrator may be approximated by the ratio of the resistance values of feedback restrictor 13c to that of input restrictor 13h. Input restrictors 13h, 13i are of equal resistance value. The output of preamplifier 12 is connected to the input of integrator 13 by means of small variable restrictors 13 j, 13k, connected for ganged operation in opposite directions of varying resistance to provide a bias adjustment for zero setting the integrator (i.e. null out any small steady state signal with no signal from the transducer which would thereby cause the integrator output to drift).

The readout means for the spirometer include three pressure gages 16, 17 and 18 connected in parallel to the positive polarity output of integrator 13. Gages 16, 17 and 18 are respectively connected to the output of the integrator through valves 15a, 15b and 15c which are operated by timer 15. Timer 15 may be a fluidic circuit having no moving mechanical parts or timer 15 may be a mechanical type such as a spring-driven timing mechanism. In either case, the timer may be of conventional design. The timing range is selected such that valves 15a, 15b and 15c open 1, 3 and 10 seconds, respectively, after a patient begins breathing through the mouthpiece transducer. The timed intervals are thus obtained by interrupting the integrator output flow to the gages with the timer valves. Gages 16, 17 and 18 thus provide readings which remain fixed until reset by the physician. The 1, 3 and 10 second intervals are generally accepted in medical practice for measuring lung capacity from which exhale rate can be obtained.

For purposes of adapting my spirometer to mass measurements where the time per patient must be minimized, and convenience for doctor office calls where usage is much less frequent, mouthpiece transducer 10 is fabricated of an economical material such as paper to permit the transducer to be a low-cost, lightweight, expendable component. In one specific embodiment, outer tube 10c is of 10-inch length, 1-inch outer diameter and 0.040-inch wall thickness. The inner tubes 10d comprise 100 to 120 tubes each of 9-inch length, 0.060-inch outer diameter and 0.010-inch wall thickness. The geometry of these inner tubes provides a desired laminar flow therethrough to thereby obtain a very linear pressure versus flow rate characteristic. .Such tube bundle provides a maximum pressure drop of approximately 0.06 p.s.i. at an air flow of 500 liters per minute which linear relationship can easily be changed by varying the number of inner tubes. Due to the constant back pressure developed at the input to preamplifier 12, no sterilization of any of the nonexpendable parts of my spirometer is necessary and the instrument is ideal for mass measurements. The use of the fluidic mouthpiece transducer also eliminates the need for the delicate, expensive pneumatic-to-electrical transducer commonly employed in conventional spirometers and my apparatus is thus a rugged, trouble-free low-cost instrument. It is appreciated that a simple orifice may be used to generate the pressure proportional to airflow rate signal rather than using a plurality of inner tubes 10d, however, the orifice generates a parabolic pressure versus flow characteristic and would require a fluidic square root circuit to provide a linear input to the integrator thereby introducing additional inaccuracies and increasing the cost. Further, the most critical operating conditions are at low flow rates through the transducer which are characteristic of emphysema patients and in this critical region the parabolic characteristic of the orifice results in near zero gain and all of these undesirable factors thereby make the use of the orifice impractical.

Manifold 31 of the mouthpiece transducer is also preferably fabricated of a low-cost material such as plastic and can be an expendable member which forms a single unit with mouthpiece 10. Alternatively, manifold 31 may be a permanent part of the nonexpendable portion of the spirometer and have a more permanent attachment to the input end of flexible tubing 11 in which case mouthpiece 10 is merely slid out of the manifold and discarded after each use. Tubing 11 which interconnects the transducer and the fluidic circuitry of the spirometer may conveniently be a plastic tube of 0.375-inch outer diameter or less.

Since air is the fluid medium introduced into the control input of preamplifier 12 from the mouthpiece transducer 10, the power fluid supplied to the various fluid amplifiers in the fluidic circuitry of components 12, 13, 14 (and 15, if the timer is fluidic) is also preferably pressurized air. The power fluid supply 19 which is the source of this pressurized power fluid may be (1) bottled gas, (2) a conventional air line or (3) an air compressor, relief valve and surge tank. The air compressor, if employed, would be the only component requiring a connection to an electrical power supply and should have a capacity for supplying approximately 1 standard cubic foot per minute (s.c.f.m.) at an operating pressure of 5 p.s.i.g. since the fluidic circuit consumption is 0.7 to 0.8 s.c.f.m. The relief valve prevents any excess air flow and maintains the 5 p.s.i.g. pressure, the surge tank (a fixed volume) filters any pressure variations generated by the compressor and relief valve. For the illustrated embodiment, the power fluid is supplied to integrator 13 and start amplifier 14 at 5 p.s.i.g., and to preamplifier 12 at 2 p.s.i.g. through pressure dropping restrictor 22. Power fluid supply 19 is preferably the bottled gas or air line for applications of the spirometer in hazardous areas such as an operating room or in remote locations.

Figure 2:
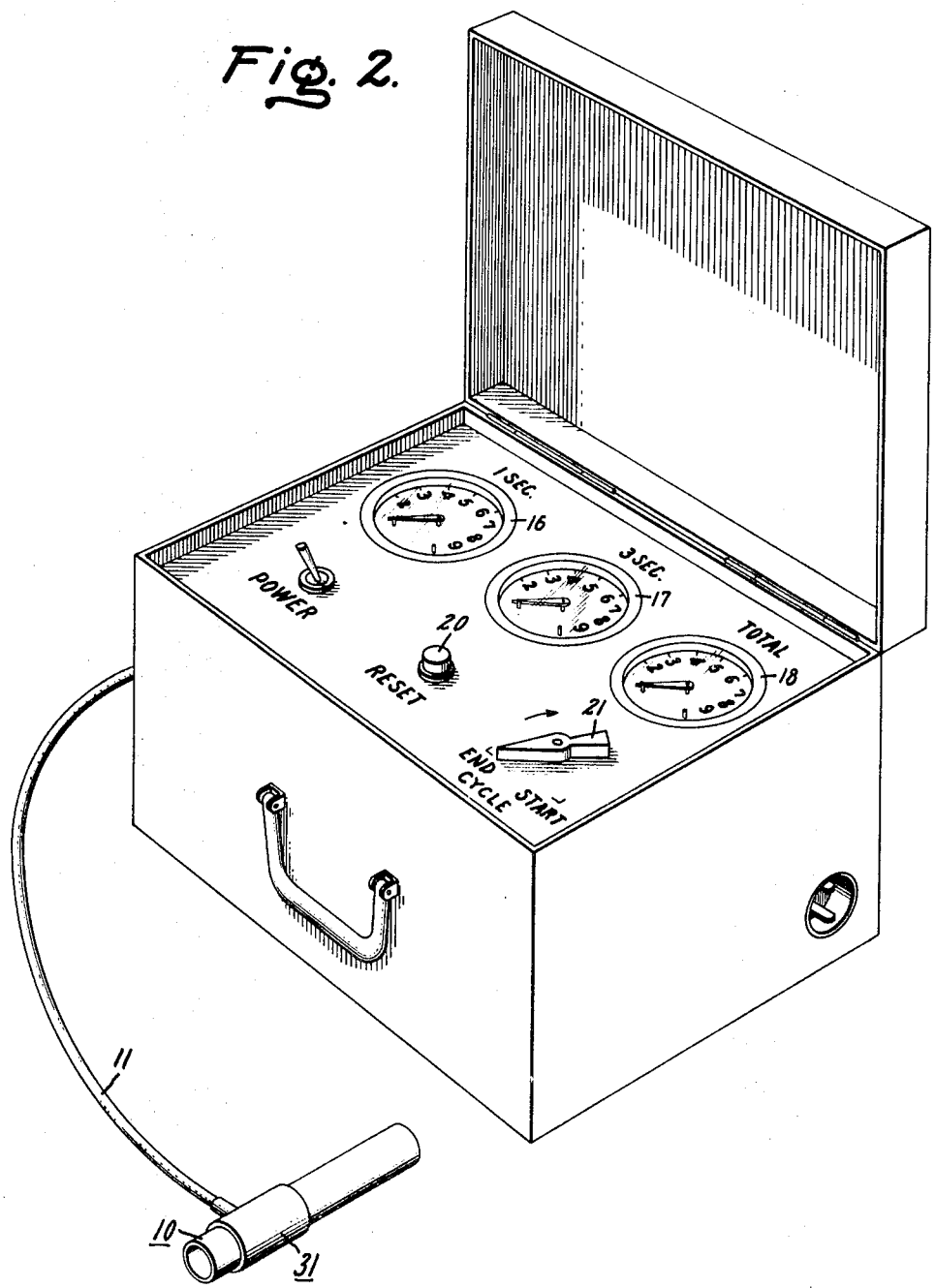
FIG. 2 is a perspective view of the assembled spirometer.

In one arrangement, the assembled spirometer is illustrated in FIG. 2, the overall volume of the instrument (with the cover being closed) is approximately 0.5 cubic feet and the weight is approximately 14 lbs. The case which encloses the components of the spirometer has a length of 12 inches, depth of 10 inches and height of 8 inches. The pressure gages 16, 17 and 18 each have a pressure range up to 7 liters.

As indicated in FIG. 2, the spirometer further includes a RESET mechanism 20 and a CYCLE START mechanism 21. The reset mechanism is a button which when manually depressed, bleeds pressure from the single (positive polarity) output line of integrator 13 to thereby reset gages 16, 17, 18 to zero and provide the proper initial condition for volume measurement. As illustrated in FIG. 1, actuation of reset switch 20 causes the output of integrator 13 to be vented.

The cycle start mechanism 21 is a knob, which when manually rotated clockwise approximately 300° as indicated on the front panel of the spirometer in FIG. 2, fully winds a conventional timing mechanism in timer 15 and latches it. The timer mechanism is released only when a pressure signal is obtained at the output of start amplifier 14. In one embodiment, the signal at the output of start amplifier 14 expands a small plastic bellows 15d shown schematically in FIG. 4 which in turn frees an escapement to allow the mechanism to timeout. Upon initiation of the timer, the escapement is held such that the timer will not stop even though the pressure signal at the output of start amplifier 14 disappears. In this particular embodiment, start amplifier 14 comprises five serially connected amplifiers providing a total pressure gain of 500 to 1,000. High gain is utilized so that only a small flow, 25 to 50 liters per minute, is required to release the timer escapement.

My spirometer is operated in the following manner, it being assumed that the CALIBRATE (and BIAS) adjustments are correct. The air supply is provided to the fluidic circuitry by connecting the instrument to a 115-volt AC outlet in the case of the power fluid supply 19 being an air compressor, relief valve and surge tank, or a valve is opened in the case of the supply 19 being bottled gas or an air line. Expendable mouthpiece 10 is inserted through manifold guide member 31b or unitary mouthpiece 10–manifold 31 is connected to the input end of tubing 11. The patient is instructed on the expiration technique to exhale as rapidly and completely as possible. The CYCLE-START knob 21 is rotated clockwise to maximum deflection. Reset button 20 is depressed. The patient is told to exhale in accordance with the above instructions. Upon completion of the exhale breath, the three gage readings are noted from which the lung capacity may be determined. Mouthpiece 10 is removed, knob 21 rotated clockwise, reset button depressed, and the instrument is ready for the next patient. Thus, it is evident that the spirometer operation is simple, automatic, and requires no interpretation but merely an observation of the gage readings.

From the foregoing description, it can be appreciated that my invention makes available an improved fluidic spirometer in the form of a compact instrument and utilizes an expendable mouthpiece transducer for generating a pressure signal proportional to airflow rate breathed therethrough. The use of fluidic circuitry including a fluidic integrator for integrating the flow rate to determine the air volume breathed by the patient provides a very reliable instrument since no moving mechanical parts are required to obtain the integration action as in conventional spirometers. My particular mouthpiece transducer also avoids the use of pneumatic-to-electrical transducers conventionally employed in spirometers and thereby avoids an additional source of malfunction.

What I claim as new and desire to secure by Letters Patent of the United States is:

1. A fluidic spirometer comprising
   an expendable mouthpiece transducer means for generating a variable pneumatic pressure signal proportional to the airflow rate therethrough, said transducer means including an output passage,
   means connected to said output passage of said mouthpiece transducer means for preventing the air flowing therethrough from entering a nonexpendable portion of the spirometer to thereby prevent contamination thereof,
   a fluidic integrator having no moving mechanical parts, said integrator including an input in communication with said preventing means and an output, said output of said integrator being a pneumatic pressure signal proportional to the volume of air flowing through said mouthpiece transducer means, and
   readout means connected to said output of said integrator for indicating the volume of air flowing through said mouthpiece transducer means over a period of time.
2. The fluidic spirometer set forth in claim 1 wherein
   said expendable mouthpiece transducer means comprises a tubular member having a first end adapted for breathing therethrough and a second end open to the atmosphere.
3. The fluidic spirometer set forth in claim 2 wherein
   said expendable mouthpiece transducer means comprises
   an outer tube, and
   a plurality of small diameter tubes disposed within said outer tube to obtain laminar flow of the air breathed therethrough.
4. The fluidic spirometer set forth in claim 3 wherein
   said plurality of small diameter tubes are each of equal length and of slightly shorter length than said outer tube,
   at least one aperture passing through the wall of said outer tube in the region removed from said plurality of small diameter tubes but closely adjacent thereto, and
   means in communication with the aperture through said outer tube for transmitting the airflow rate generated pressure signal from said mouthpiece means transducer to said preventing means.
5. The fluidic spirometer set forth in claim 4 wherein
   second ends of said plurality of small diameter tubes are disposed in close proximity to the second end of said outer tube and, the aperture through the wall of said outer tube is located closely adjacent the first ends of said small diameter tubes and in the region near the first end of said outer tube.
6. The fluidic spirometer set forth in claim 5 wherein
   said outer tube and said plurality of small diameter tubes are fabricated of paper.
7. The fluidic spirometer set forth in claim 5 wherein
   said outer tube is of approximately 10-inch length, 1-inch outer diameter and 0.040-inch wall thickness, and
   said plurality of small diameter tubes are each of 9-inch length, 0.05-inch inner diameter and 0.010-inch wall thickness.
8. The fluidic spirometer set forth in claim 4 and further comprising a manifold body including a first cylindrical member enclosing said outer tube along a portion of the length thereof which includes the aperture therethrough.
9. The fluidic spirometer set forth in claim 8 wherein
   said manifold body further including a tubular passage member extending radially outward from said first cylindrical member and provided with means for quickly disconnecting said signal-transmitting means from said manifold body,
   said-signal-transmitting means comprising a flexible tubing having a first end adapted for quick connection and disconnection with the tubular passage member of said manifold body, and
   said mouthpiece transducer means and said manifold body forming a unitary body which is expendable and quickly connected and disconnected from the nonexpendable portion of the spirometer resulting in a short time interval per patient for the measurement of lung capacity.

10. The fluidic spirometer set forth in claim 8 wherein
said manifold body further including a tubular passage member extending radially outward from said first cylindrical member, the outer end of said tubular passage member connected to said signal-transmitting means, and
said manifold body further including a cylindrical guide member for quickly directing said expendable mouthpiece transducer means into and out of said first cylindrical member resulting in a short time interval per patient for the measurement of lung capacity.

11. The fluidic spirometer set forth in claim 1 and further comprising
means connected to the output of said integrator for reducing the pressure thereat to substantially zero to provide an initial condition of zero setting on said readout means prior to beginning measurement of a patient's lung capacity.

12. The fluidic spirometer set forth in claim 1 wherein
said readout means comprises a first pressure gage.

13. The fluidic spirometer set forth in claim 4 wherein
said readout means comprises
first, second and third pressure gages connected in parallel to the output of said integrator, and
timing means in communication with said preventing means for controlling the operation of said first gage for a short time interval, controlling the operation of said second gage over a longer time interval, and controlling the operation of said third gage over a still longer time interval corresponding to the total breathing test period whereby said third gage records the total lung capacity.

14. The fluidic spirometer set forth in claim 13 wherein the time interval of operation of said first, second and third gages if 1, 3 and 10 seconds, respectively,
said spirometer further comprising
first high gain proportional type fluid amplifier means for amplifying the air flow rate generated pressure signal, said first amplifier means having no moving mechanical parts and having an input in communication with said preventing means and an output connected to an actuating member in said timing means for initiating operation thereof upon the first flow of air being breathed through said mouthpiece transducer.

15. The fluidic spirometer set forth in claim 14 and further comprising
second high gain proportional type fluid amplifier means having no moving mechanical parts and having an input connected to said preventing means and the output in communication with the input of said integrator for permitting lower gain operation thereof.

16. The fluidic spirometer set forth in claim 15 wherein
said second amplifier means output is also connected to the input of said first amplifier means whereby said second amplifier means functions as a preamplifier.

17. The fluidic spirometer set forth in claim 15 wherein
said second amplifier means comprising
at least one stage of proportional type fluid amplifier,
an input network including first and second restrictors having second ends thereof respectively connected to first and second control inputs of the first stage amplifier, the first end of said first restrictor connected to an output end of said signal transmitting means, the first end of said second restrictor connected to a vent,
said preventing means comprising third and fourth restrictors connected in series from the first end of said first restrictor to the first end of said second restrictor,
said second amplifier means further comprising a power fluid input connection to each stage of the fluid amplifiers, the juncture of said third and fourth restrictors connected to a power fluid source supplying the power fluid inputs of said second amplifier means to thereby develop a constant pressure at the juncture of said first and third restrictors of magnitude exceeding the maximum signal pressure generated in said mouthpiece transducer.

18. The fluidic spirometer set forth in claim 17 wherein
said second amplifier means further comprising a negative feedback network including fifth and sixth restrictors having first ends thereof respectively connected to first and second outputs of the last stage amplifier and second ends respectively connected to said first and second control inputs of said first stage amplifier, said fifth and sixth restrictors being of the variable fluid resistance type and connected for ganged operation in the same direction of varying resistance to provide a gain adjustment for calibrating said readout means.

19. The fluidic spirometer set forth in claim 15 and further comprising
seventh and eighth restrictors having first ends thereof respectively connected to first and second outputs of said second amplifier means, and second ends respectively connected to first and second inputs of said integrator, said seventh and eighth restrictors being of the variable fluid resistance type and connected for ganged operation in opposite directions of varying resistance to provide a bias adjustment for zero setting of said integrator.